US006642685B2

(12) United States Patent
Onodera

(10) Patent No.: US 6,642,685 B2
(45) Date of Patent: Nov. 4, 2003

(54) FORCE-FEEDBACK INPUT DEVICE CONTAINING TWO TILT POSITION DETECTION MEANS FOR OPERATING MEMBER

(75) Inventor: Mikio Onodera, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/271,390

(22) Filed: Oct. 15, 2002

(65) Prior Publication Data

US 2003/0074089 A1 Apr. 17, 2003

(30) Foreign Application Priority Data

Oct. 16, 2001 (JP) ...................................... 2001-317720

(51) Int. Cl.[7] ............................ B25J 19/02; G09G 5/08
(52) U.S. Cl. .................................... 318/568.16; 345/161
(58) Field of Search ...................... 318/508.16; 345/161

(56) References Cited

U.S. PATENT DOCUMENTS 4,156,130 A * 5/1979 Ivashin et al. ................ 377/17
5,125,602 A 6/1992 Vauvelle
5,160,918 A * 11/1992 Saposnik et al. ........... 345/161
5,456,428 A 10/1995 Hegg
5,589,854 A * 12/1996 Tsai ........................... 345/161
5,724,068 A * 3/1998 Sanchez et al. ............. 345/161
5,929,607 A 7/1999 Rosenberg et al.
6,004,134 A * 12/1999 Marcus et al. ................ 434/45
6,154,198 A * 11/2000 Rosenberg .................. 345/161
6,195,592 B1 * 2/2001 Schuler et al. ................ 700/83
6,201,196 B1 * 3/2001 Wergen ...................... 200/6 A
2002/0080115 A1 * 6/2002 Onodera et al. ............ 345/161
2002/0080116 A1 * 6/2002 Onodera et al. ............ 345/161
2003/0010517 A1 * 1/2003 Onodera ...................... 174/50

* cited by examiner

*Primary Examiner*—Robert E. Nappi
*Assistant Examiner*—Patrick Miller
(74) *Attorney, Agent, or Firm*—Brinks Hofer Gilson & Lione

(57) ABSTRACT

A force-feedback input device contains a tiltable first operating member, a pair of first detecting members for detecting a tilt position of the first operating member and operated by the first operating member, and a pair of motors for conveying a force of the first operating member; and further having a detection means operated while slaved to movement of the first operating member, and since the tilt position of the first operating member can be detected by the detection means, even if the first detecting members break down, the tilt position of the first operating member can be detected by an auxiliary detection means installed separately from the first operating means, so that tilt position of the first operating member can be reliably detected.

8 Claims, 6 Drawing Sheets

FORCE-FEEDBACK INPUT DEVICE CONTAINING TWO TILT POSITION DETECTION MEANS FOR OPERATING MEMBER

BACKGROUND OF THE INVENTION

1. Field of the Invention

The present invention relates to force-feedback input device used for example in operating automobile air conditioners and in particular ideal for utilizing the force occurring during operation.

2. Description of Related Art

A force-feedback input device of the related art is described utilizing FIG. 9. A box-shaped frame 51 has a square top plate 51*a*, a round hole 51*b* formed in this top plate 51*a*, and four side walls 51*c* bent downwards on the periphery of the four sides of top plate 51*a*.

First and second linkage member 52, 53 made from metal plate each have respective slits 52*a* and 53*a* in their centers and form an arc shape. The first linkage member 52 is housed inside the frame 51 with both ends respectively attached to a pair of side walls 51*c* facing each other. The first linkage member 52 can rotate with these installation sections as supporting points.

The second linkage member 53 is housed inside the frame 51 to mutually intersect the first linkage member 52. Both ends of the second linkage member 53 are respectively attached to the remaining pair of side walls 51*c*. The second linkage member 53 can rotate with these installation sections as supporting points.

The straight operating member 54 is inserted into the intersection of the slits 52*a*, 53*a* of the first and second linkage members 52, 53 and can engage with the first and second linkage members 52, 53. One end of the operating member 54 protrudes outward through the hole 51*b* of the frame 51 and the other end is supported by the supporting member 55 installed in the bottom of the frame 51 and the operating member 54 can be tilted.

When the operating member 54 protruding from hole 51*b* is gripped and this operating member 54 is then moved (operated), the operating member 54 is tilted around the supporting points constituting the points supporting by the supporting member 55. The first and second linkage members 52, 53 engaging with this operating member 54 rotate along with the tilting movement of this operating member 54.

When in neutral position, the operating member 54 is perpendicular to the supporting member 55. In this neutral position, when the operating member 54 is tilted in the direction of arrow A parallel to the slit 52*a*, the second linkage member 53 engages with the operating member 54 and rotates.

Also, when the operating member 54 in neutral position is tilted in the direction of arrow B parallel to the slit 53*a*, the first linkage member 52 engages with the operating member 54 and rotates. Further, when the operating member 54 in a position midway between the arrow A direction and the arrow B direction is tilted in the direction of arrow C, both of the first and second linkage members 52, 53 engage with the operating member 54 and both (the first and second linkage members) rotate.

The first and second detection members 56, 57 constituting the rotation type sensors are respectively comprised of main pieces 56*a*, 57*a*, and rotating shafts 56*b*, 57*b* attached to the main pieces 56*a*, 57*a* and capable of rotation.

The first and second detection members 56, 57 are installed on the supporting member 55 on the same horizontal plane. The rotating shaft 56*b* of the first detection member 56 engages with one end of the first linkage member 52 and rotates along with rotation of the first linkage member 52, and the first detection member 56 is in this way operated.

The rotating shaft 57*b* of the second detection member 57 engages with one end of the second linkage member 53 and rotates along with rotation of the second linkage member 53, and the second detection member 57 is in this way operated.

The first and second detection members 56, 57 are configured for detecting the tilt position of the operating member 54.

The first and second motors 58, 59 are respectively comprised of main pieces 58*a*, 59*a*, and rotating shafts 58*b*, 59*b* attached to these main pieces 58*a*, 59*a* and capable of rotation.

The first and second motors 58, 59 are installed on the supporting member 55 on the same horizontal plane. The rotating shaft 58*b* of the first motor 58 engages with the rotating shaft 56*b* of the first detection member 56. The rotational force of the first motor 58 is conveyed to the rotating shaft 56*b* by the rotating shaft 58*b*. The rotating shaft 59*b* of the second motor 59 engages with the rotating shaft 57*b* of the first detection member 57. The rotational force of the second motor 59 is conveyed to the rotating shaft 57*b* by the rotating shaft 59*b*.

The operation of the force-feedback input device of the related art as comprised above is described next. When the operating member 54 is tilted, the first and second linkage members 52, 53 rotate and the rotating shafts 56*b*, 57*b* are respectively rotated by the rotation of the first and second linkage members 52, 53 operating the first and second detection members 56, 57, and the tilt position of the operating member 54 is detected.

When the operating member 54 is tilted, a signal is sent from the control section (not shown in drawing) to the first and second motors 58, 59. The first and second motors 58, 59 are then driven and their driving force is conveyed to the rotating shafts 56*b*, 57*b* of the first and second detection members 56, 57.

The driving force of the first and second motors 58, 59 is thereupon applied as the resistive force (or force-feedback or Haptic) of the tilting of the operating member 54.

However, the force-feedback input device of the related art has the problem that if the first or second detection members 56 or 57 broke for some reason, or if the rotating shaft 56*b* or 57*b* broke for some reason, then the tilt position of the operating member 54 cannot be detected.

SUMMARY OF THE INVENTION

The present invention therefore has the object of providing a force-feedback input device that is compact and can reliably detect the tilt position of the operating member.

To resolve the above-mentioned problem, the invention has a first solution means having a tiltable first operating member, a pair of first detection members for detecting a tilt position of the first operating member and operated by the first operating member, and a pair of motors to convey force feedback to the first operating member. The first solution means further has a detection means slaved to and operated by the movement of the first operating member. The tilt position of the first operating member can be detected by the detection means.

In this kind of structure, even if the first detection member breaks, the tilt position of the first operating member can be detected by a separately installed supplementary detection means and the detection of the tilt position of the first operating member can be reliably performed.

A second solution means of the invention is comprised of a tiltable second operating member, a pair of second detection members operated by the second operating member. The second detection member is slaved to and operated by the first operating member and the tilt position of the first operating member can be detected by the pair of the second detection members.

The detection means with this kind of structure can be comprised of a compact, inexpensive joystick type input device.

In a third solution means of the invention, a tip of the second operating member engages with an engaging section formed on an edge of the first operating member, and the second operating member is slaved to and operated by the first operating member.

In a structure of this type, the second operating member reliably follows up (is slaved to) the first operating member and reliable operation is obtained.

As a fourth solution means, the detection means is installed along an axial direction of the first operating member.

In a structure of this type, the detection means is compact, can be easily stored with a good space factor and has good operability.

As a fifth solution means, the second detection member is comprised of a rotating variable resistor or a rotating encoder.

In a structure of this type, the second detection member can be made at a low price so that a low-cost product is obtained.

DETAILED DESCRIPTION OF THE PREFERRED EMBODIMENTS

Figure 1:
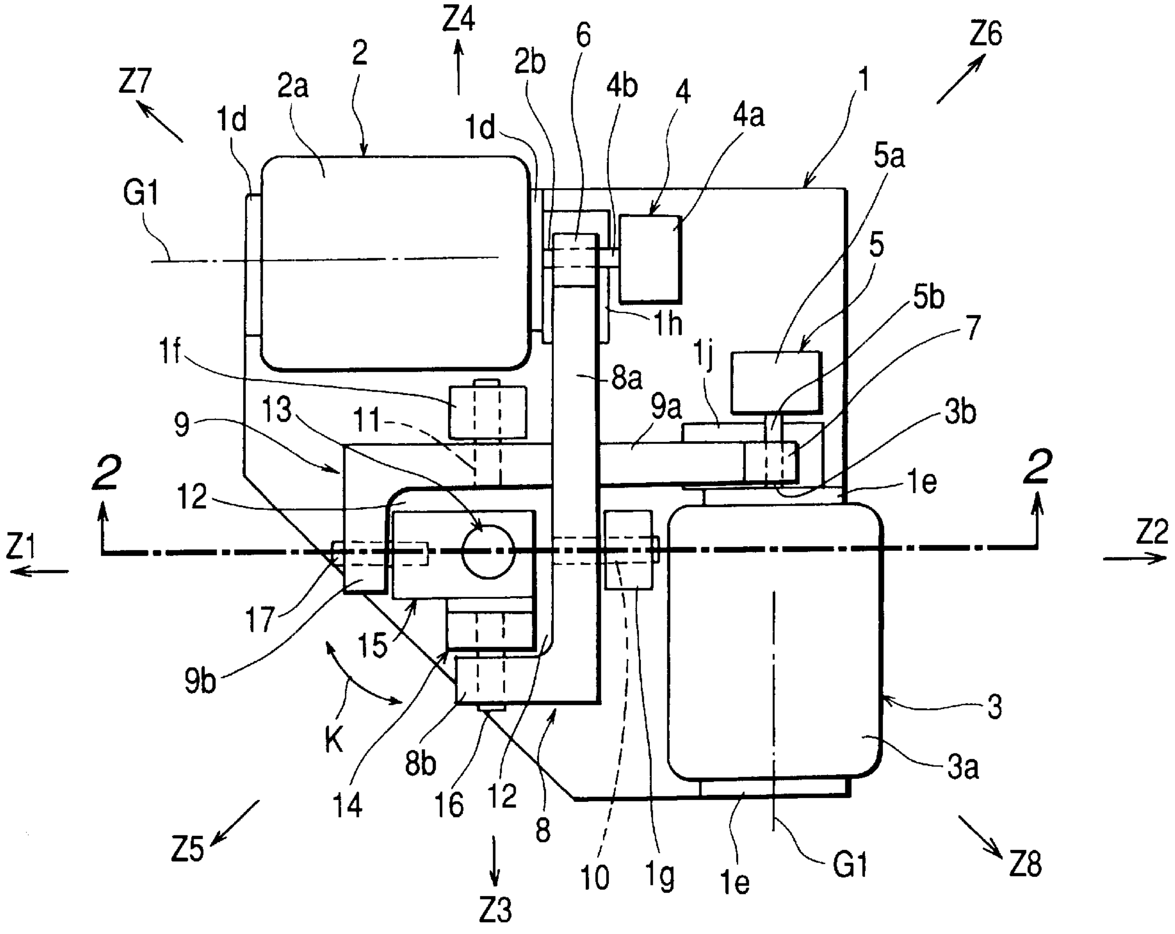
FIG. 1 is a flat view of the force-feedback input device of the present invention.
Figure 2:
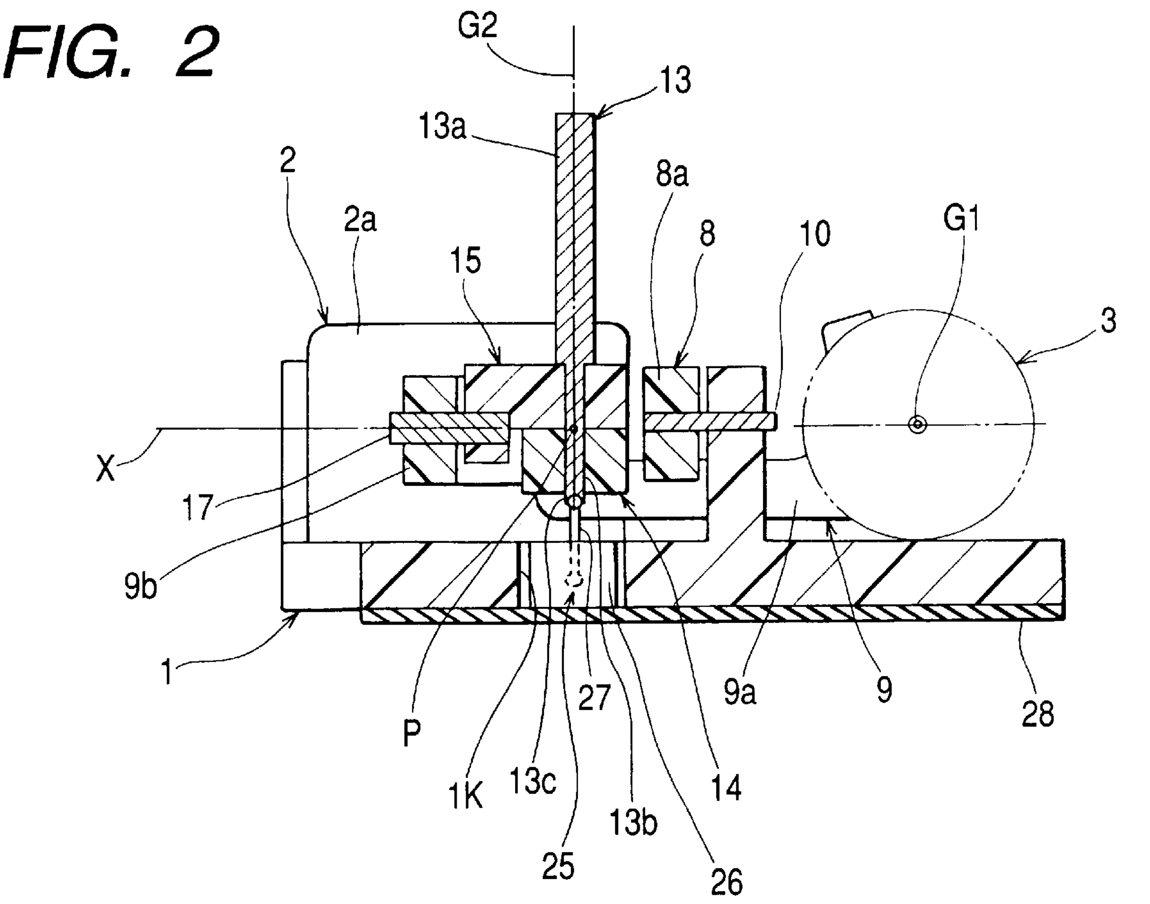
FIG. 2 is a cross sectional view taken along lines 2—2 of FIG. 2.
Figure 3:
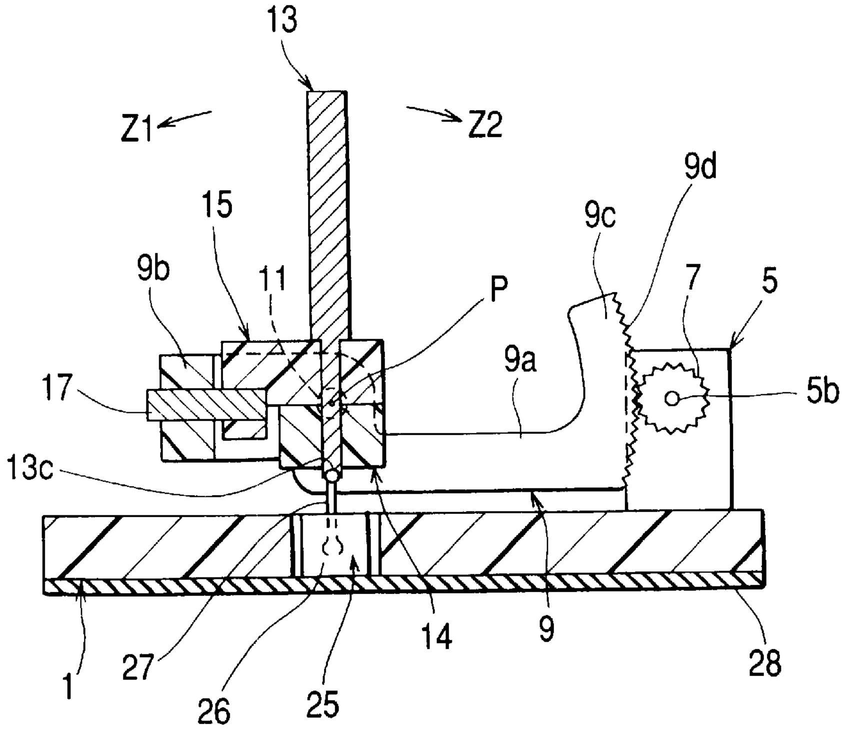
FIG. 3 is a cross sectional view of an essential portion of the force-feedback input device of the present invention.
Figure 4:
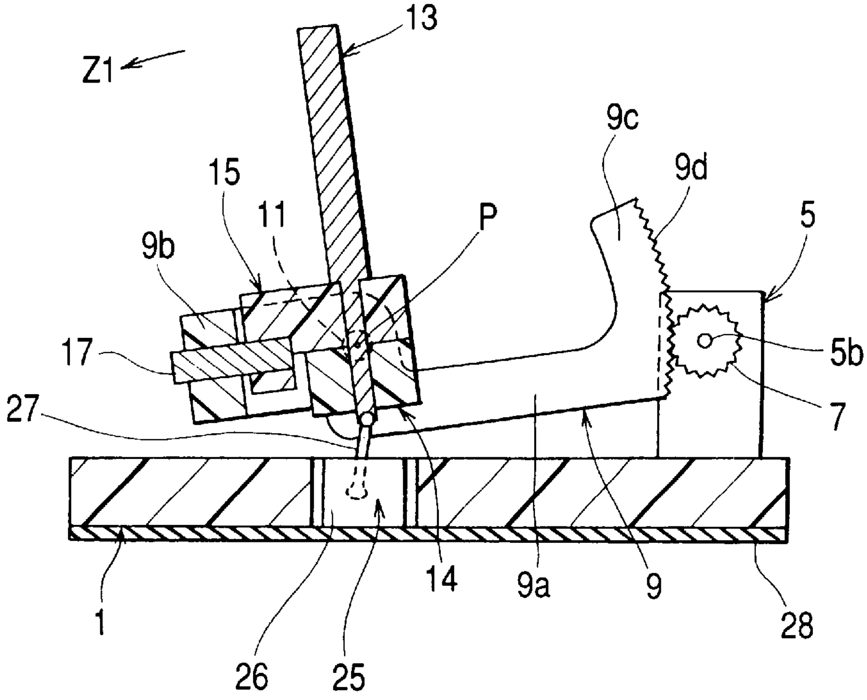
FIG. 4 is a drawing showing an operational view of the first operating member while tilted to the left in the force-feedback input device of the present invention.
Figure 5:
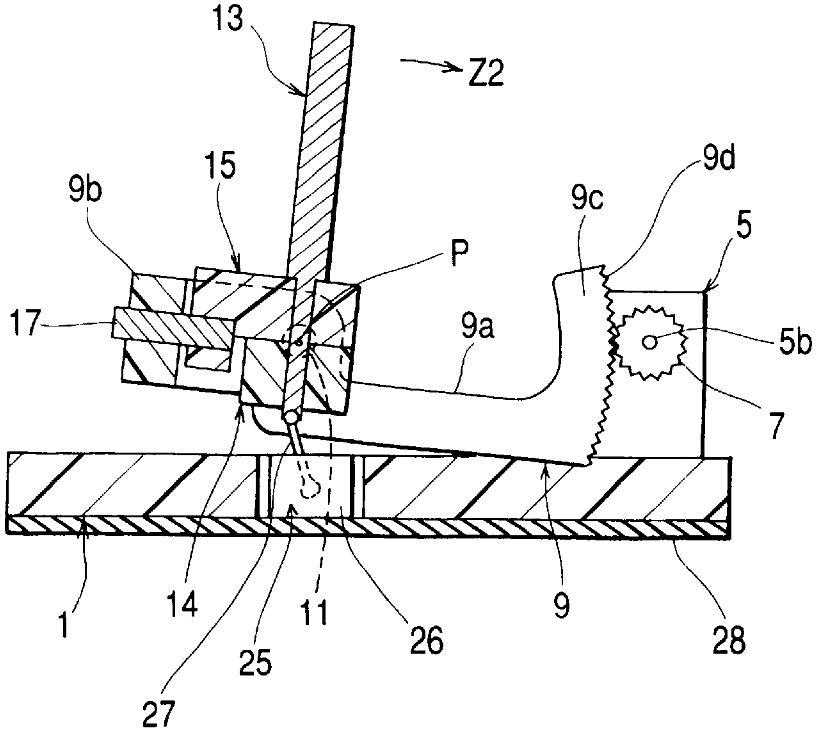
FIG. 5 is a drawing showing an operational view of the first operating member while tilted to the right in the force-feedback input device of the present invention.
Figure 6:
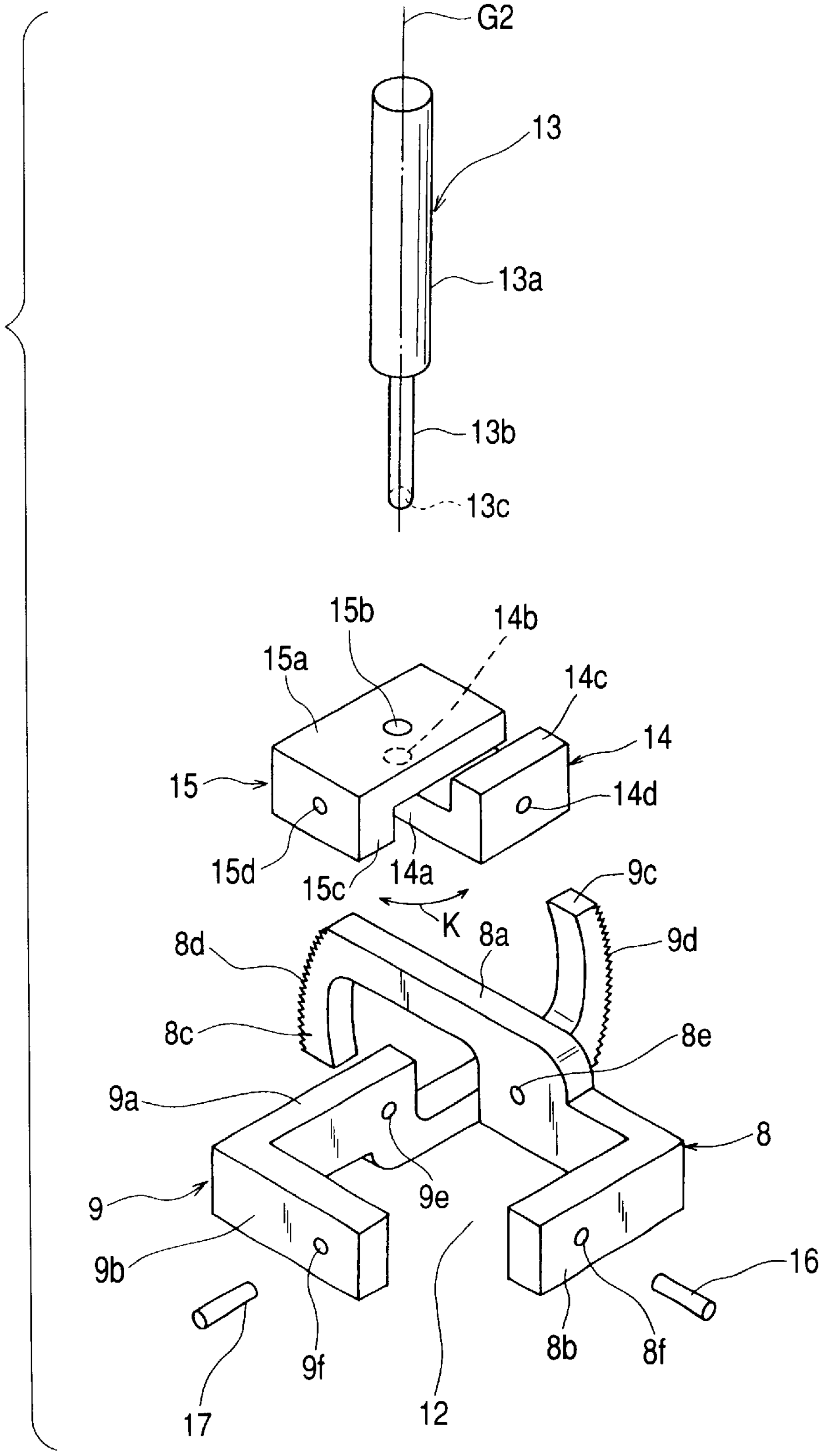
FIG. 6 is an exploded perspective view showing the first operating member, drive piece and drive lever.
Figure 7:
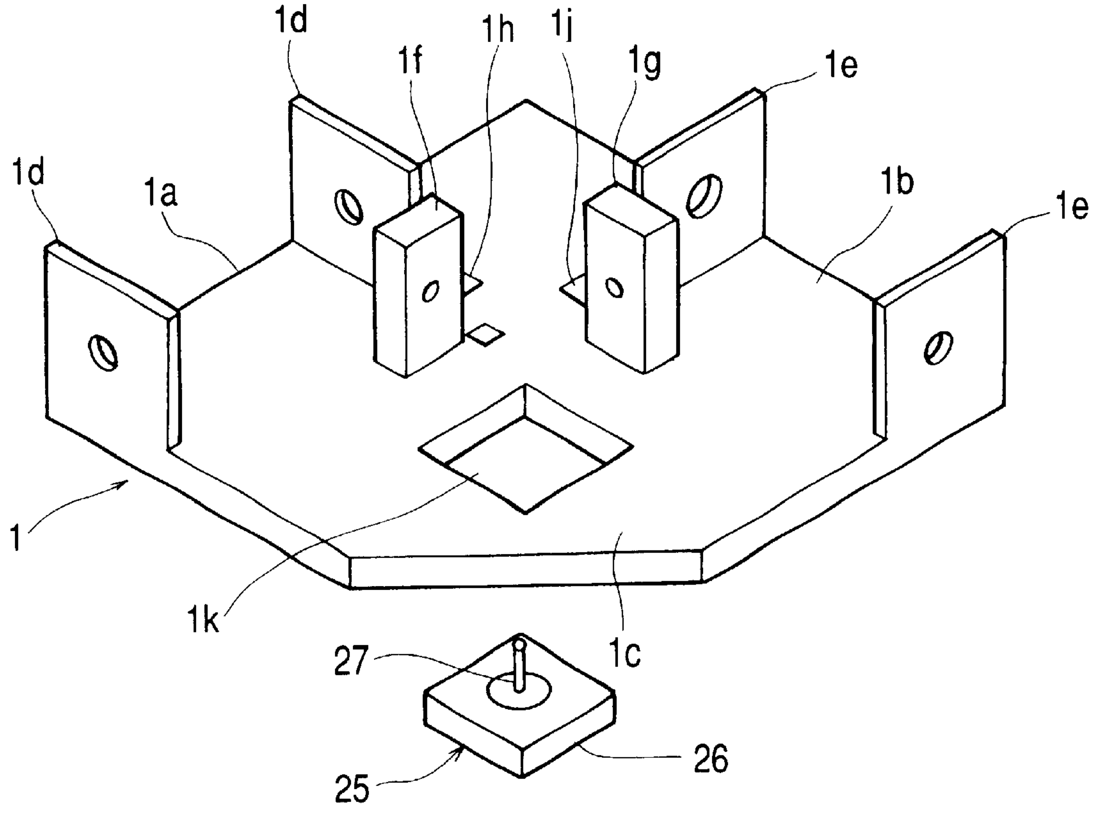
FIG. 7 is a perspective view showing the supporting member and detection means of the force-feedback input device of the present invention.
Figure 8:
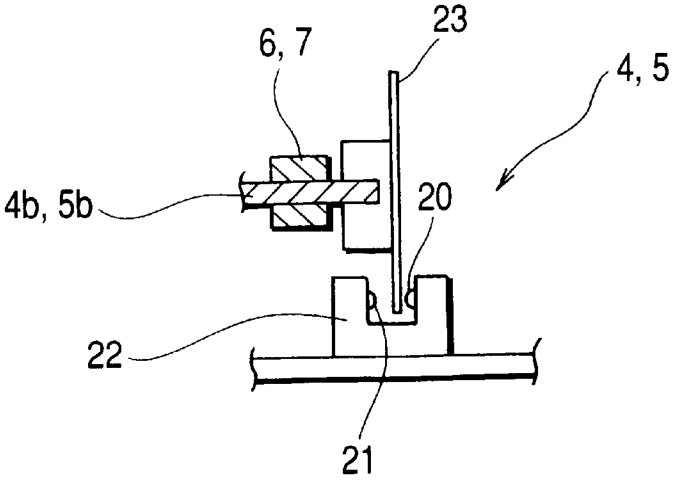
FIG. 8 is a cross sectional view of an essential portion of the structure of the first detection member in the force-feedback input device of the present invention.
Figure 9:
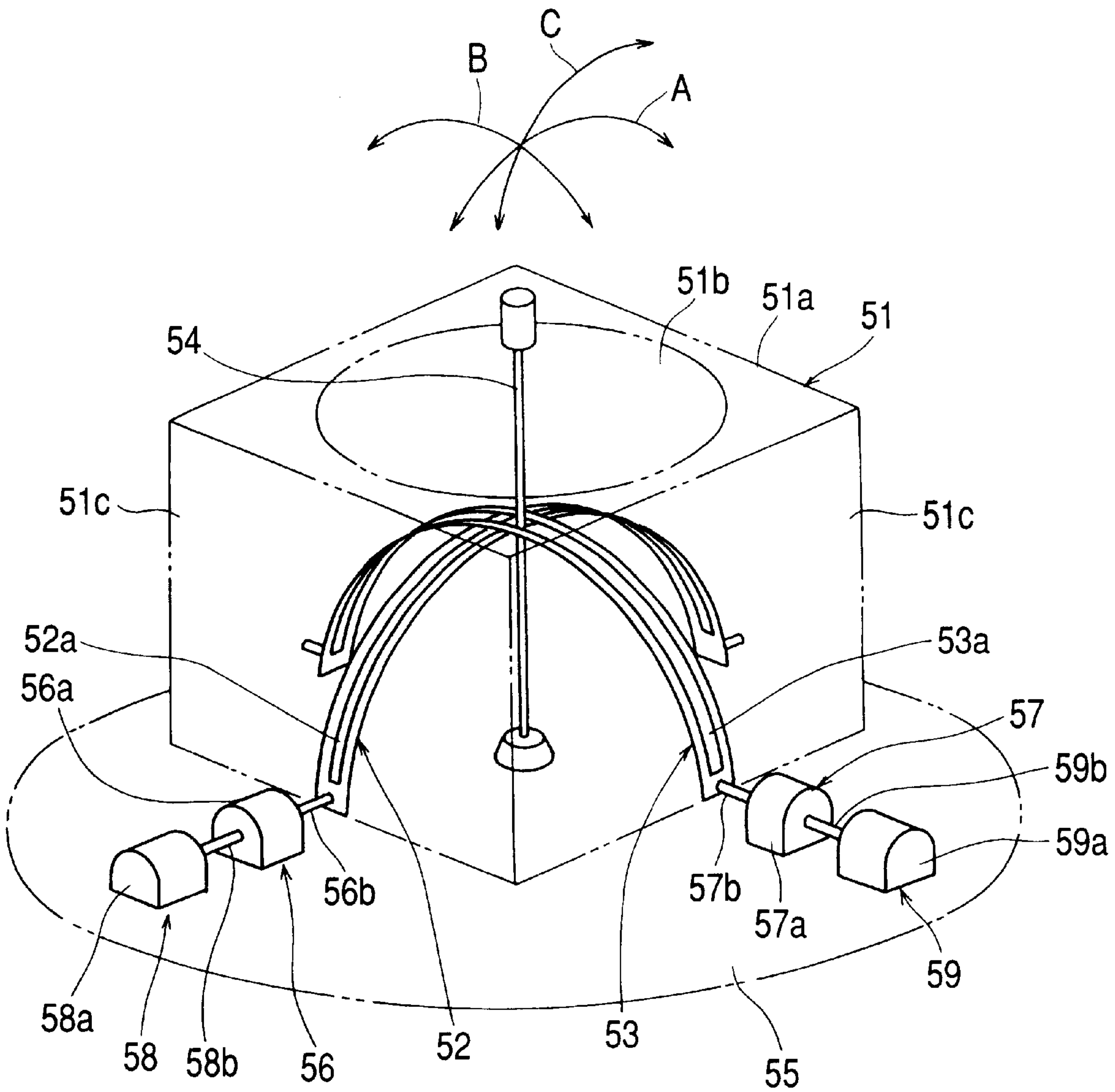
FIG. 9 PRIOR ART
FIG. 9 is a perspective view of the force-feedback input device of the related art.

The force-feedback input device of the present invention is described while referring to these accompanying drawings. FIG. 1 is a plan view of the force-feedback input device of the present invention. FIG. 2 is a cross sectional view taken along lines 2—2 of FIG. 1. FIG. 3 is a cross sectional view of an essential section of the force-feedback input device of the present invention. FIG. 4 is a drawing showing the operation when the first operating member is tilted to the left side in the force-feedback input device of the present invention. FIG. 5 is a drawing showing the operation when the first operating member is tilted to the right side in the force-feedback input device of the present invention. FIG. 6 is an exploded perspective view showing the first operating member and drive piece, as well as the drive lever in the force-feedback input device of the present invention. FIG. 7 is a perspective view of the supporting member and detection means in the force-feedback input device of the present invention. FIG. 8 is a cross sectional view of an essential section for showing the structure of the first detection member in the force-feedback input device of the present invention.

The structure of the force-feedback input device of the present invention is described next while referring to FIG. 1 through FIG. 8. The supporting member 1 made from molded plastic is shown in FIG. 7. The supporting member 1 is comprised of a first and second areas 1*a*, 1*b* facing each other diagonally, a linkage section 1*c* linking these first and second areas 1*a*, 1*b*, a pair of installation pieces 1*d*, 1*e* respectively protruding upwards from the first and second areas 1*a*, 1*b* and installed to have a mutual gap, a pair of supporting section 1*f*, 1*g* protruding respectively upwards from the first and second areas 1*a*, 1*b* and installed near the connecting section 1*c*, escape holes 1*h*, 1*j* formed in the first and second areas 1*a*, 1*b* and near one of the installation pieces 1*d*, 1*e*, and a hole 1*k* formed in the connecting section 1*c*.

The first and second motors 2, 3 have respective main pieces 2*a*, 3*a* and rotating shafts 2*b*, 3*b* capable of rotation and installed on these main pieces 2*a*, 3*a*.

The first motor 2 is installed on the first area 1*a* with the front and rear sides of the main piece 2*a* secured by the respective pair of installation pieces 1*d*. The second motor 3 is installed on the second area 1*b* with the front and rear sides of the main piece 3*a* secured by the respective pair of installation pieces 1*e*.

The first and second motors 2, 3 are installed so that the axial lines G1 of the rotating shafts 2*b*, 3*b* are perpendicular (at right angles) to each other as shown in FIG. 1.

The pair of detection members 4, 5 constituted by encoders such as rotating sensors or rotating variable potentiometers have respective main pieces 4*a*, 5*a*, and rotating shafts 4*b*, 5*b* installed for rotation on these main pieces 4*a*, 5*a*.

The first detection member 4 is installed on the supporting member 1 and the rotating shaft 4*b* is integrated as one piece coaxially with the rotating shaft 2*b* of the first motor 2. The first detection member 5 is installed on the supporting member 1 and the rotating shaft 5*b* is integrated as one piece coaxially with the rotating shaft 3*b* of the second motor 3.

By means of this type of structure, the rotational force of the respective shafts 4*b*, 5*b* of the first detection members 4, 5 is conveyed to the respective rotating shafts 2*b*, 3*b* of the first and second motors 2, 3; and the rotational force of the respective rotating shafts 2*b*, 3*b* of the first and second motors 2, 3 is conveyed to the respective shafts 4*b*, 5*b* of the first detection members 4, 5.

Further, the first detection members 4, 5 are operated when the rotating shafts 4*b*, 5*b* are rotated.

In this embodiment, the rotating shaft of the motor and the rotating shaft of the detection member were described as being coaxially formed into one piece. However, the rotating shafts of the motor and detection member may be formed as separate components and both of these separate rotating shaft components may be linked by a linking (or connecting) member; or gears may be attached to the respective separate rotating shaft components so that the gears intermesh with each other to convey the rotational force of the detection member rotating shaft to the rotating shaft of the motor or to convey the rotational force of the motor to the rotating shaft of the detection member.

The first and second motors 2, 3 and the first detection members 4, 5 are installed on the same surface on the supporting member 1.

The first and second gears 6, 7 are installed on the rotating shafts 4*b*, 5*b* of the respective first detection members 4, 5. The first detection members 4, 5 are operated by the rotation of these first and second gears 6, 7.

As shown in particular in FIG. 6, the first and second drive levers 8, 9 made from a molded plastic product have arms 8*a*, 9*a* extending in a straight line, clamps 8*b*, 9*b* installed bent at a right angle from one end of these arms 8*a*, 9*a*, protrusions 8*c*, 9*c* protruding in an arc shape from the other end of these arms 8*a*, 9*a*, teeth sections 8*d*, 9*d* installed on the arc-shaped outer circumferential surface of these arc-shaped protrusions 8*c*, 9*c*, holes 8*e*, 9*e* formed in the arms 8*a*, 9*a* positioned between the clamps 8*b*, 9*b* and teeth sections 8*d*, 9*d*, and holes 8*f*, 9*f* formed in the clamps 8*b*, 9*b*.

The arm 8*a* of the first drive lever 8 is installed perpendicular to the axial line G1 of the first motor 2, and is supported by the rod 10 inserted in the hole 8*e* and installed in the supporting section 1*g* to be capable of seesaw type movement.

When this first drive lever 8 has been installed, the teeth section 8*d* engages with the first gear 6, and the first drive lever 8 becomes capable of seesaw movement centering on the rod 10. The clamp 8*b* moves up and down when the first drive lever 8 makes a seesaw movement and along with this action, the teeth section 8*d* on the other hand of the arm 8*a* moves up and down with a movement opposite that of the clamp 8*b*.

This up and down movement of the teeth section 8*d* rotates the first gear 6, which consequently moves the rotating shaft 4*b* and operates the first detection member 4.

The arm 9*a* of the second drive lever 9 is installed perpendicular to the axial line G1 of the second motor 3, and is supported by the rod 11 inserted in the hole 9*e* and installed in the supporting section 1*f* to be capable of seesaw type movement.

When this second drive lever 9 has been installed, the teeth section 9*d* engages with the second gear 7, and the second drive lever 9 becomes capable of seesaw movement centering on the rod 11. The clamp 9*b* moves up and down when the second drive lever 9 moves as a seesaw and along with this action, the teeth section 9*d* on the other end of the arm 9*a* moves up and down in a movement opposite that of the clamp 9*b*.

This up and down movement of the teeth section 9*d* rotates the second gear 7 which consequently moves the rotating shaft 5*b* and operates the first detection member 5.

When the first and second drive levers 8, 9 are installed, the respective arms 8*a*, 9*a* cross each other and along with being installed in an intersecting state, a space 12 is formed enclosed by the arms 8*a*, 9*a* and the bent clamps 8*b*, 9*b*.

The first and second drive levers 8, 9 are formed in the same size, shape and structure and are installed to mutually face each other in opposite downward and upward directions as shown in FIG. 6.

In other words, the protrusion 8*c* of the first drive lever 8 protrudes downwards, and the protrusion 9*c* of the second drive lever 9 protrudes upwards so that striking each other is avoided during seesaw movement.

The first operating member 13 made of a metal or molded plastic product has a large diameter operating section 13*a*, a small diameter holding section 13*b* installed to extend from this operating section 13*a* along the axial line G2, and a linking section 13*c* forming a concave section on the tip of the holding section 13*b*.

The first and second drive pieces 14, 15 made from metal or molded plastic are respectively formed in an L shape as shown in particular in FIG. 6. These first and second drive pieces 14, 15 have perpendicular plate sections 14*a*, 15*a* along axial line G2, through holes 14*b*, 15*b* formed on the top and bottom of these plate sections 14*a*, 15*a*, side plates 14*c*, 15*c* extending along a flat surface from one end of the plate sections 14*a*, 15*a* along the axial line G2, and holes 14*d*, 15*d* formed in these side plates 14*c*, 15*c*.

The side plates 14*c*, 15*c* of the first and second drive pieces 14, 15 face in opposite directions along the axial line G2 and both protrude into the sides of plate sections 14*a*, 15*a*. In a state where the plate sections 14*a*, 15*a* are mutually overlapping, the holding section 13*b* of first operating member 13 inserts through the respective holes 14*b*, 15*b*. The first and second drive pieces 14, 15 are installed on the holding section 13*b* by a suitable means so that the first operating member 13 will not come loose from the first and second drive pieces 14, 15.

When the first and second drive pieces 14, 15 are installed, the respective side plates 14*c*, 15*c* are perpendicular (at right angles) to each other. The second drive pieces 14, 15 can respectively rotate in the direction of the arrow K (clockwise and counterclockwise directions) around the holding section 13*b*.

The first and second drive pieces 14, 15 connected in the first operating member 13 are inserted in the space 12 formed by the first and second drive levers 8, 9. These first and second drive pieces 14, 15 are inserted through a rod 16 inserted in the hole 8*f* formed in the clamp 8*b* of the first drive lever 8 and the hole 14*d* of the side plate 14*c*. The first operating member 13 and the first drive piece 14 are installed by the rod 16 so that both can move.

A rod 17 is inserted into the hole 9*f* formed in the clamp 9*b* of the second drive lever 9 and the hole 15*d* of side place 15*c* to clamp (install) the first operating member 13 and the second drive member 15 so that both can rotate by way of the rod 17.

When the first operating member 13 and the first and second drive pieces 14, 15 are clamped (installed) onto the first and second drive levers 8, 9, the first operating member 13 is capable of tilting around the tilt center P. When the first and second drive pieces 14, 15 are at a position separate from the upper edge of the supporting piece 1, the axial line G2 of the first operating member 13 is perpendicular to the supporting member 1 while the first operating member 13 is not operating and is in neutral position.

When the first operating member 13 is installed, the arms 8*a* and 9*a* of the first and second drive levers 8, 9 are at mutual right angles on the perpendicular surface intersecting the axial line G2 direction. Also, the first and second motors 2, 3 and the first detection members 4, 5 installation positions are along the tilt position P of the first and second drive pieces 14, 15. The horizontal X axis direction perpendicular to axial line G2 of the first operating member 13, and the axial line G1 of the first and second motors 2, 3 are aligned with each other on the same plane.

As shown in FIG. 8, the first detection members 4, 5 of the embodiment are comprised of photo interruptors (translucent type encoders). A light emitting element 20 and a light receiving element 21 are clamped to the holding member 22. A rotating piece 23 comprised of a code plate formed with slits (not shown in drawing) is attached to the rotating shafts 4*b*, 5*b*. Along with rotation of the rotating shafts 4*b*, 5*b* by rotation of the gears 6, 7 attached to these the rotating shafts 4*b*, 5*b*, the rotating piece 23 rotates between the light emitting element 20 and the light receiving element 21 and rotating detection can in this way be accomplished.

The detection means 25 is comprised of a box-shaped frame piece 26, a second operating member 27 with one end protruding from the frame 26 and tiltable with respect to the frame piece 26, a linkage member installed in an intersecting position within the frame piece 26 and not shown in the drawing here, and a pair of second detecting members slaved to and operated by the motion of this linkage member.

The second detection member housed within this frame piece 26 is a rotating sensor consisting of a rotating type encoder or rotating variable resistor. The second detection member is operated by way of the linkage member when the second operating member 27 is tilted.

This kind of detection member 25 is installed in a state where the tip of the second operating member 27 is connected to the engaging piece 13*c* of the first operating member 13, and the frame piece 26 is housed within the hole 1*k* of the supporting member 1. The frame piece 26 is also attached to the printed circuit board 28 installed in the lower part of the supporting member 1.

In other words, in a state where the first operating member 13 is in the center position, the detection means 25 is installed along the axial line G2 of the first operating member 13.

In the detection means 25 installed in this way, when the first operating member 13 tilts, the second operating member 27 is slaved to tilt with the engaging piece 13*c* or in other words follows the motion of the first operating member 13. In this way, along with operating the second detection member, the second detection member operation is able to detect the tilt position of the first operating member 13.

In other words, this detection means 25 functions as a supplementary means to detect the tilt position of the first operating member 13.

The operation of the force-feedback input device of the present invention having the above structure is described next. First of all, when the first operating member is tilted from the neutral position as shown in FIG. 3 in the direction of arrow Z1 (direction extending from arm 9*a* of the second drive lever 9), then the first and second drive pieces 14, 15 are also tilted around the center P along with the first operating member 13 as shown in FIG. 4.

At this time, on the second drive member 15, the rod 17 catches on the clamp 9*b* of the second drive lever 9 and the clamp 9*b* is moved downward along the axial line G2.

The second drive lever 9 then makes seesaw movement with the rod 11 as the pivot point. The teeth section 9*d* positioned on the end side of arm 9*a* of the second drive lever 9 consequently moves upward along the axial line G2. The gear 7 is in this way made to rotate and the first detection member 5 is operated.

On the other side, the first drive piece 14 moves with the rod 16 as the center and the first drive lever 8 performs no seesaw movement so no up and down movement occurs and it is in neutral position.

Next, when the first operating member 13 tilts from neutral position in the direction of the arrow Z2 (direction extending from arm 9*a* of the second drive lever 9), then the first and second drive members 14, 15 also tilt centering on the center P along with the first operating member 13 as shown in FIG. 5.

At this time, on the second drive member 15, the rod 17 catches on the clamp 9*b* of the second drive lever 9 and the clamp 9*b* is moved upward along the axial line G2.

The second drive lever 9 thereupon makes seesaw movement with the rod 11 as the pivot point. The teeth section 9*d* positioned on the end side of arm 9*a* of the second drive lever 9 consequently moves downward along the axial line G2. The gear 7 is in this way made to rotate and the first detection member 5 is operated.

On the other side, the first drive piece 14 moves with the rod 16 as the center and the first drive lever 8 performs no seesaw movement so no up and down movement occurs and it is in neutral position.

Next, when the first operating member 13 is tilted from neutral position in the direction of the arrow Z3 (direction extending from arm 8*a* of the first drive lever 8), then the first and second drive members 14, 15 are also tilted centering on the center P along with the first operating member 13.

At this time, on the first drive member 14, the rod 16 catches on the clamp 8*b* of the first drive lever 8 and the clamp 8*b* is moved downward along the axial line G2.

The first drive lever 8 thereupon makes seesaw movement with the rod 10 as the pivot point. The teeth section 8*d* positioned on the end side of the arm 8*a* of the first drive lever 8 consequently moves upward along the axial line G2. The gear 6 is in this way made to rotate and the first detection member 4 is operated.

On the other side, the second drive piece 15 moves with the rod 17 as the center and the second drive lever 9 performs no seesaw movement so no up and down movement occurs and it is in neutral position.

Next, when the first operating member 13 is tilted from neutral position in the direction of the arrow Z4 (direction extending from arm 8*a* of the first drive lever 8), then the first and second drive members 14, 15 are also tilted centering on the center P along with the first operating member 13.

At this time, on the first drive member 14, the rod 16 catches on the clamp 8*b* of the first drive lever 8 and the clamp 8*b* is moved upward along the axial line G2.

The first drive lever 8 thereupon makes a seesaw movement with the rod 10 as the pivot point. The teeth section 8*d* positioned on the end side of the arm 8*a* of the first drive lever 8 consequently moves downward along the axial line G2. The gear 6 is in this way made to rotate and the first detection member 4 is operated.

On the other side, the second drive piece 15 moves centering on the rod 17 and the second drive lever 9 performs no seesaw movement so no up and down movement occurs and it is in neutral position.

Next, when the first operating member 13 is tilted from neutral position in the direction of the arrow Z5 between the arrow Z1 direction and arrow Z3 direction, then the first and second drive members 14, 15 are also tilted centering on the center P along with the first operating member 13.

At this time, on the first drive member 14, the rod 16 catches on the clamp 8*b* of the first drive lever 8, and on the second drive member 15, the rod 17 catches on the clamp 9*b* of the second drive lever 9, and the clamps 8*b*, 9*b* are moved downward along the axial line G2.

The first and second drive levers 8, 9 thereupon respectively make seesaw movement with the rods 10, 11 as the pivot point. The teeth sections 8*d*, 9*d* positioned on the end side of the respective arms 8*a*, 9*a* of the first and second drive levers 8, 9 consequently move upward along the axial line G2. The gears 6 and 7 are in this way made to rotate and the first detection members 4, 5 are respectively operated.

Also, when the first and second drive members 14, 15 are tilted in the direction of arrow Z5, the distances between rod 10 and rod 16, and between rod 11 and 17 in neutral position are different from their distances when tilted, so the first and second drive members 14, 15 rotate centering on the first operating member 13 and smooth tilting operating is therefore achieved.

Next, when the first operating member 13 is tilted from neutral position in the direction of arrow Z6 between the arrow Z2 and arrow Z4 directions, then the first and second drive members 14, 15 are also tilted centering on the center P along with the first operating member 13.

At this time, on the first drive member 14, the rod 16 catches on the clamp 8*b* of the first drive lever 8, and on the second drive member 15, the rod 17 catches on the clamp 9*b* of the second drive lever 9, and the clamps 8*b*, 9*b* are moved upward along the axial line G2.

The first and second drive levers 8, 9 thereupon respectively make seesaw movement with the rods 10, 11 as the pivot point. The teeth sections 8*d*, 9*d* positioned on the end side of the respective arms 8*a*, 9*a* of the first and second drive levers 8, 9 consequently move downward along the axial line G2. The gears 6 and 7 are in this way made to rotate and the first detection members 4, 5 are respectively operated.

Also, even when the first and second drive members 14, 15 are tilted in the arrow Z6 direction, the first and second drive members 14, 15 rotate centering on the first operating member 13, the same as previously when tilted towards direction Z5, so a smooth tilting operating is achieved.

Next, when the first operating member 13 is tilted from neutral position in the direction of arrow Z7 between the arrow Z1 and arrow Z4 directions, then the first and second drive members 14, 15 are also tilted centering on the center P along with the first operating member 13.

At this time, on the first drive member 14, the rod 16 catches on the clamp 8*b* of the first drive lever 8, and the clamp 8*b* is moved upward along axial line G2. On the second drive member 15, however, the rod 17 catches on the clamp 9*b* of the second drive lever 9, and the clamp 9*b* moves downward along the axial line G2.

The first and second drive levers 8, 9 thereupon respectively make a seesaw movement with the rods 10, 11 as the pivot point. The teeth section 8*d* positioned on the end side of the arm 8*a* of the first and second drive levers 8 consequently moves downward along the axial line G2. Also, the teeth section 9*d* positioned on the end side of the arm 9*a* of the second drive lever 9 moves upward along the axial line G2. The gears 6 and 7 are in this way made to rotate and the respective first detection members 4, 5 are operated.

Further, even when the first and second drive members 14, 15 are tilted in the arrow Z7 direction, the first and second drive members 14, 15 rotate centering on the first operating member 13 so that a smooth tilting operating is achieved.

Next, when the first operating member 13 is tilted from neutral position in the direction of arrow Z8 between the arrow Z2 and arrow Z3 directions, the first and second drive members 14, 15 are also then tilted centering on the center P along with the first operating member 13.

At this time, on the first drive member 14, the rod 16 catches on the clamp 8*b* of the first drive lever 8 and the clamp 8*b* is moved downward along axial line G2. On the second drive member 15 however, the rod 17 catches on the clamp 9*b* of the second drive lever 9, and the clamp 9*b* moves upward along the axial line G2.

The first and second drive levers 8, 9 thereupon respectively make seesaw movement with the rods 10, 11 as the pivot point. The teeth section 8*d* positioned on the end side of the arm 8*a* of the first and second drive levers 8 consequently moves upward along the axial line G2. Also, the teeth section 9*d* positioned on the end side of the arm 9*a* of the second drive lever 9 moves downward along the axial line G2. The gears 6 and 7 are in this way made to rotate and the respective first detection members 4, 5 are operated.

Further, even when the first and second drive members 14, 15 are tilted in the arrow Z8 direction, the first and second drive members 14, 15 rotate centering on the first operating member 13 so that a smooth tilting operating is achieved.

The first and second detection members 4, 5 are therefore operated in this way so that the tilt position of the first operating member 13 can be detected.

Also, during tilt operation of the first operating member 13, a signal is sent from the control section (not shown in drawing) to the first and second motors 2, 3. The first and second motors 2, 3 are then driven and their driving force is conveyed to the rotating shafts 4*b*, 5*b* of the first detection members 4, 5.

The driving force of the first and second motors 2, 3 is thereupon applied as the resistive force (or force-feedback or Haptic) of the first operating member 13.

When the first operating member 13 is tilted in the direction of arrows Z1 through Z8, the second operating member 27 of the detection means 25 is tilted in a direction opposite the direction that the first operating member 13 is tilted.

Further, when the first drive member 13 is tilted in the direction of arrows Z1 through Z8, the second detection member of detection means 25 is also operated while slaved to the first operating member 13, and the tilt position of the first operating member 13 is detected by the first detection members 4, 5.

Also, when the first detection members 4 or 5, or the rotating shaft 4*b*, 5*b* have broken for some reason, the control circuit detects this breakdown and moves the detection means 25 serving as a supplementary detection means. The tilt position of the first operating member 13 is therefore detected by this detection means 25.

A force-feedback input device of the present invention is comprised of a tiltable first operating member 13, a pair of first detecting members 4, 5 for detecting the tilt position of this first operating member 13 and operated by the first operating member 13, and a pair of motors 2, 3 for conveying the force of the first operating member 13. The force-feedback device further has a detection means 25 operated while slaved to the movement of the first operating member 13. Since the tilt position of the first operating member 13 can be detected by this detection means 25, even if the first detecting members 4, 5 break down, the tilt position of the first operating member 13 can be detected by an auxiliary detection means 25 installed separately from the first detecting members 4, 5, so that the tilt position of the first operating member 13 can be reliably detected.

What is claimed is:

1. A force-feedback device comprising:

a tiltable first operating member;

a pair of first detection members to detect a tilt position of the first operating member and operated by the first operating members;

a pair of motors to convey force-feedback to the first operating member; and a detector slaved to and operated by movement of the first operating member, wherein the detector comprises a tiltable second operating member and a pair of second detection members operated by the second operating member, the second operating member is slaved to and operated by the first operating member, and the tilt position of the first operating member is detectable by the pair of second detection members.

2. A force-feedback device according to claim 1, wherein a tip of the second operating member engages with an engaging section formed on an edge of the first operating member, and wherein the second operating member is slaved to and operated by the first operating member.

3. A force-feedback device according to claim 1, wherein the detector is installed along an axial direction of the first operating member.

4. A force-feedback device according to claim 1, wherein the second detection member is comprised of one of a rotating variable resistor and a rotating encoder.

5. A force-feedback device according to claim 2, wherein the detector is installed along an axial direction of the first operating member.

6. A force-feedback device according to claim 2, wherein the second detection member is comprised of one of a rotating variable resistor and a rotating encoder.

7. A force-feedback device according to claim 3, wherein the second detection member is comprised of one of a rotating variable resistor and a rotating encoder.

8. A force-feedback device according to claim 5, wherein the second detection member is comprised of one of a rotating variable resistor and a rotating encoder.

* * * * *